US008701709B2

(12) United States Patent  
Athanasiades et al.

(10) Patent No.: US 8,701,709 B2
(45) Date of Patent: Apr. 22, 2014

(54) WATER SUPPLY CONTROL SYSTEM

(75) Inventors: Neocles G. Athanasiades, E. Setauket, NY (US); Kiam Meng Toh, Hauppauge, NY (US); John E. McLoughlin, Hauppauge, NY (US)

(73) Assignee: ROM Acquisition Corporation, Belton, MO (US)

( * ) Notice: Subject to any disclaimer, the term of this patent is extended or adjusted under 35 U.S.C. 154(b) by 467 days.

(21) Appl. No.: 13/177,310

(22) Filed: Jul. 6, 2011

(65) Prior Publication Data

US 2013/0008518 A1 Jan. 10, 2013

(51) Int. Cl.
| | |
|---|---|
| *F16K 11/22* | (2006.01) |
| *A62C 25/00* | (2006.01) |
| *A62C 37/50* | (2006.01) |
| *A62C 99/00* | (2010.01) |
| *F21V 33/00* | (2006.01) |

(52) U.S. Cl.
CPC .............. *F16K 11/22* (2013.01); *A62C 25/005* (2013.01); *A62C 37/50* (2013.01); *A62C 99/009* (2013.01); *F21V 33/0064* (2013.01)
USPC ........... 137/599.11; 137/875; 169/16; 169/23

(58) Field of Classification Search
CPC .... F16K 11/22; A62C 25/005; A62C 99/009; A62C 37/50; F21V 33/0064
USPC ............ 137/599.11, 875, 565.35; 169/23, 16, 169/18; 362/96
See application file for complete search history.

(56) References Cited

U.S. PATENT DOCUMENTS

| 833,143 | A | | 10/1906 | Wolf | |
|---|---|---|---|---|---|
| 1,351,781 | A | * | 9/1920 | Meushaw et al. | 137/599.11 |
| 1,355,832 | A | * | 10/1920 | Heffernan | 137/625.29 |
| 1,578,957 | A | * | 3/1926 | Coates | 137/599.11 |
| 1,750,927 | A | * | 3/1930 | Diez | 137/565.35 |
| 2,804,879 | A | * | 9/1957 | Hanson | 137/112 |
| 3,871,614 | A | | 3/1975 | Hughes et al. | |
| 4,040,771 | A | | 8/1977 | Leach | |

(Continued)

OTHER PUBLICATIONS

Wikipedia, the free encyclopedia, Four-way-valve.

(Continued)

*Primary Examiner* — John Fox
(74) *Attorney, Agent, or Firm* — Andrews Kurth LLP

(57) ABSTRACT

A water supply control system for use with a fire hydrant comprises a four-way valve assembly having a first inlet port for coupling to a nozzle of the fire hydrant via a fire hose, the four-way valve assembly operable to selectively open and close the inlet and outlet ports according to an operating mode of the four-way valve assembly, a stable and sturdy platform substantially supporting the weight of the four-way valve assembly, a flexible tether strap secured to the platform at a first end and having a fastener at a second end for releasably coupling to the fire hydrant, a status indicator mounted on the four-way valve assembly operable to provide a visual indication of the operation mode of the four-way valve assembly, and a scene light mounted on the four-way assembly operable to provide high-intensity illumination.

13 Claims, 3 Drawing Sheets

(56) References Cited

U.S. PATENT DOCUMENTS

| | | | | |
|---|---|---|---|---|
| 4,234,879 A | * | 11/1980 | Baker | 340/686.3 |
| 4,561,459 A | | 12/1985 | Jackman | |
| 5,795,053 A | * | 8/1998 | Pierce | 362/96 |
| 5,888,051 A | | 3/1999 | McLoughlin et al. | |
| 5,988,219 A | | 11/1999 | Larsen | |
| 8,245,790 B2 | * | 8/2012 | Lozier | 169/43 |
| 2009/0208346 A1 | | 8/2009 | Mcloughlin et al. | |
| 2011/0064591 A1 | | 3/2011 | Mcloughlin et al. | |

OTHER PUBLICATIONS

Jones Wet Barrel Fire Hydrants, www.jamesjones.com, Decatur, Illinios.

* cited by examiner

WATER SUPPLY CONTROL SYSTEM

FIELD

The present disclosure relates to a water supply control system for firefighting applications.

BACKGROUND

Firefighting is a highly dangerous task that subjects firefighters to many hazards. An important asset to the firefighting companies is a steady and abundant water supply, such as supplied by a fire hydrant. The water from the fire hydrant is typically conducted to the site of the fire via a fire hose connected to the hydrant's nozzle. In some instances, a booster pumper is used to increase the water pressure from the hydrant. Previously, a number of valve devices have been developed to couple the fire hose and the booster pumper to the fire hydrant discharge nozzle. However, these previous devices are bulky, heavy, and difficult to manipulate and connect to the fire hydrant. Due to the high pressure of the hydrant water, these difficulties often pose additional risks to the firefighters.

SUMMARY

A water supply control system for firefighting applications is envisioned and described herein.

A water supply control system for use with a fire hydrant comprises a four-way valve assembly having a first inlet port for coupling to a nozzle of the fire hydrant via a segment of a fire hose, and a first outlet port for alternately flushing debris and water from the fire hydrant and coupling to an intake line of a booster pump, and a second inlet port for coupling to a discharge line of the booster pump, and a second outlet port for coupling to a fire hose conducting water from the fire hydrant to the site of fire, the four-way valve assembly operable to selectively open and close the inlet and outlet ports according to an operating mode of the four-way valve assembly, a stable and sturdy platform substantially supporting the weight of the four-way valve assembly, a flexible tether strap secured to the platform at a first end and having a fastener at a second end for releasably coupling to the fire hydrant, a status indicator mounted on the four-way valve assembly operable to provide a visual indication of the operation mode of the four-way valve assembly, and a scene light mounted on the four-way assembly operable to provide high-intensity illumination.

A method to control water supplied by a fire hydrant comprises coupling a four-way valve assembly to a nozzle of the fire hydrant using a first fire hose, the weight of the four-way valve assembly being substantially supported by a platform secured thereto, the four-way valve assembly including a first inlet port for coupling to the fire hydrant nozzle, and a first outlet port for alternately flushing debris and water from the fire hydrant and coupling to an intake line of a booster pump, and a second inlet port for coupling to a discharge line of the booster pump, and a second outlet port for coupling to a second fire hose conducting water from the fire hydrant to the site of fire, the four-way valve assembly operable to selectively open and close the inlet and outlet ports according to an operating mode of the four-way valve assembly, the four-way valve assembly further includes a first valve chamber disposed between the first inlet and outlet ports, a second valve chamber disposed between the second inlet and outlet ports, a passageway connecting the first and second valve chambers, a first valve operable to alternately close off the passageway in a first operating position or close off the second inlet port in a second operating position, a second valve operable to close off the second outlet port, and a third valve operable to close off the first outlet port, securely tethering the four-way valve assembly to the fire hydrant using a chain, flushing debris and water from the hydrant via the first outlet port by opening the third valve, delivering water from the hydrant via the second outlet port by opening the second valve and receiving visual indication confirming the proper operation of the second valve, and boosting water pressure by attaching an intake line of a booster pump to the first outlet port, and a discharge line of the booster pump to the first inlet port, and allowing the first valve to be in the first operating position to close off the passageway connected between the first and second valve chambers.

DETAILED DESCRIPTION

Figure 1:
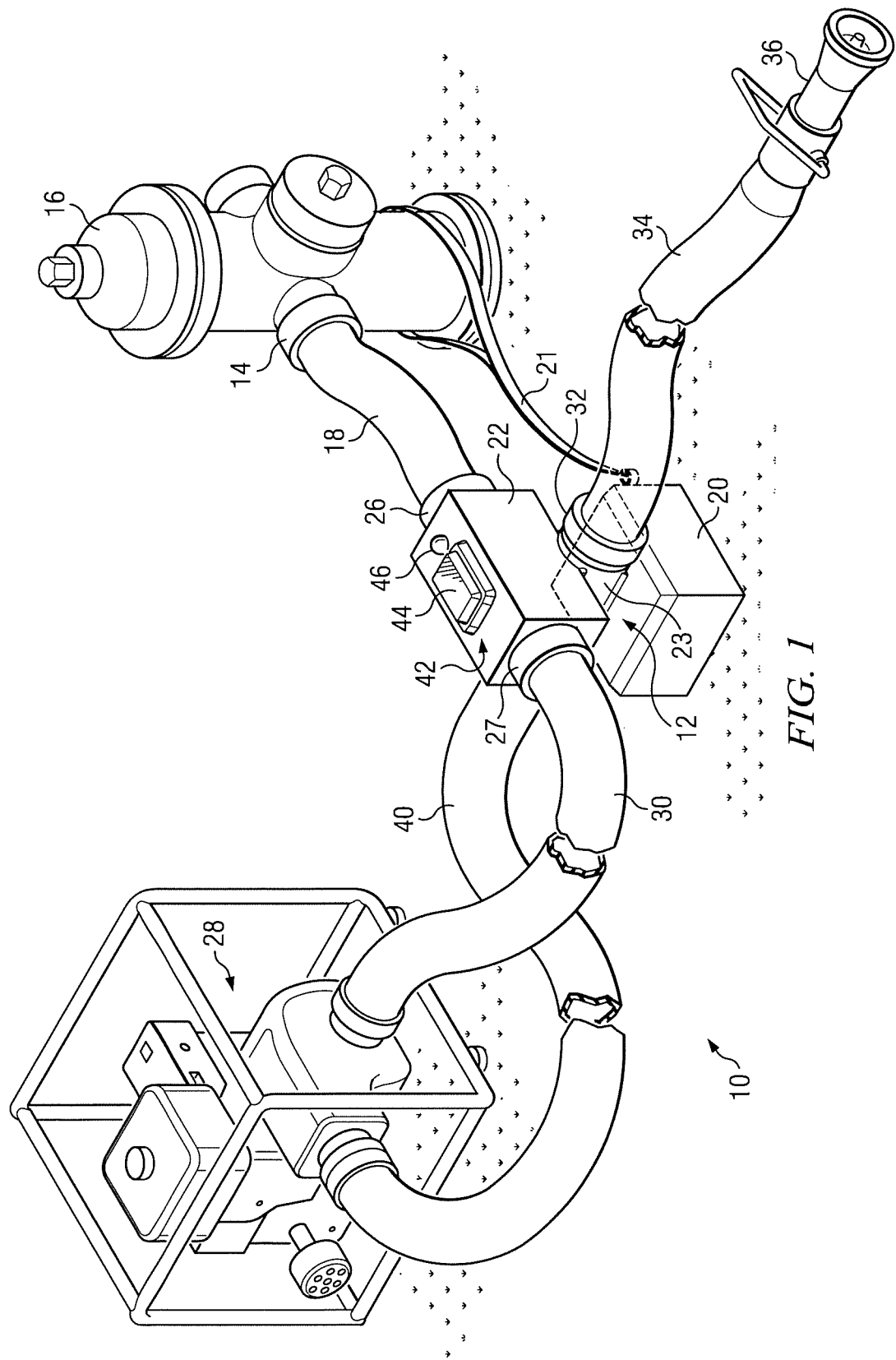
FIG. 1 is a perspective view of an exemplary embodiment of a water supply control system for firefighting applications.

FIG. 1 is a perspective view of an exemplary embodiment of a water supply control system 10 for firefighting applications. Also referring to FIG. 2 for a top plan view, water supply control system 10 includes a four-way valve assembly 12 that has two inlet ports and two outlet ports described in more detail below. Water supply control system 10 is coupled to a nozzle 14 of a fire hydrant 16 via a fire hose segment 18. Valve assembly 12 Fire hose segment 18 has sufficient length to permit water supply control system 10 to be positioned on the ground a predetermined distance from fire hydrant 16. Preferably, valve assembly 12 is coupled to a mounting plate or platform 20 of appropriate dimensions (width, length, and height) and weight to provide a sturdy and stable platform to keep water supply control system 10 upright. Any suitable material may be used to construct platform 20 such as metal, for example. A sturdy and flexible strap or chain 21 is used to securely tether water supply control system 10 to fire hydrant 16 so no stress or strain is applied to hose segment 18 and the connections thereof to hydrant 16 and water supply control system 10. Strap 21 may be secured to mounting plate 20 and incorporates a quick-release fastener or a loop so that the other end thereof may be easily and releasably fastened to water hydrant 16. Strap 21 may be constructed of any appropriate material, including metals, natural or man-made fibers, leather, etc.

Figure 2:
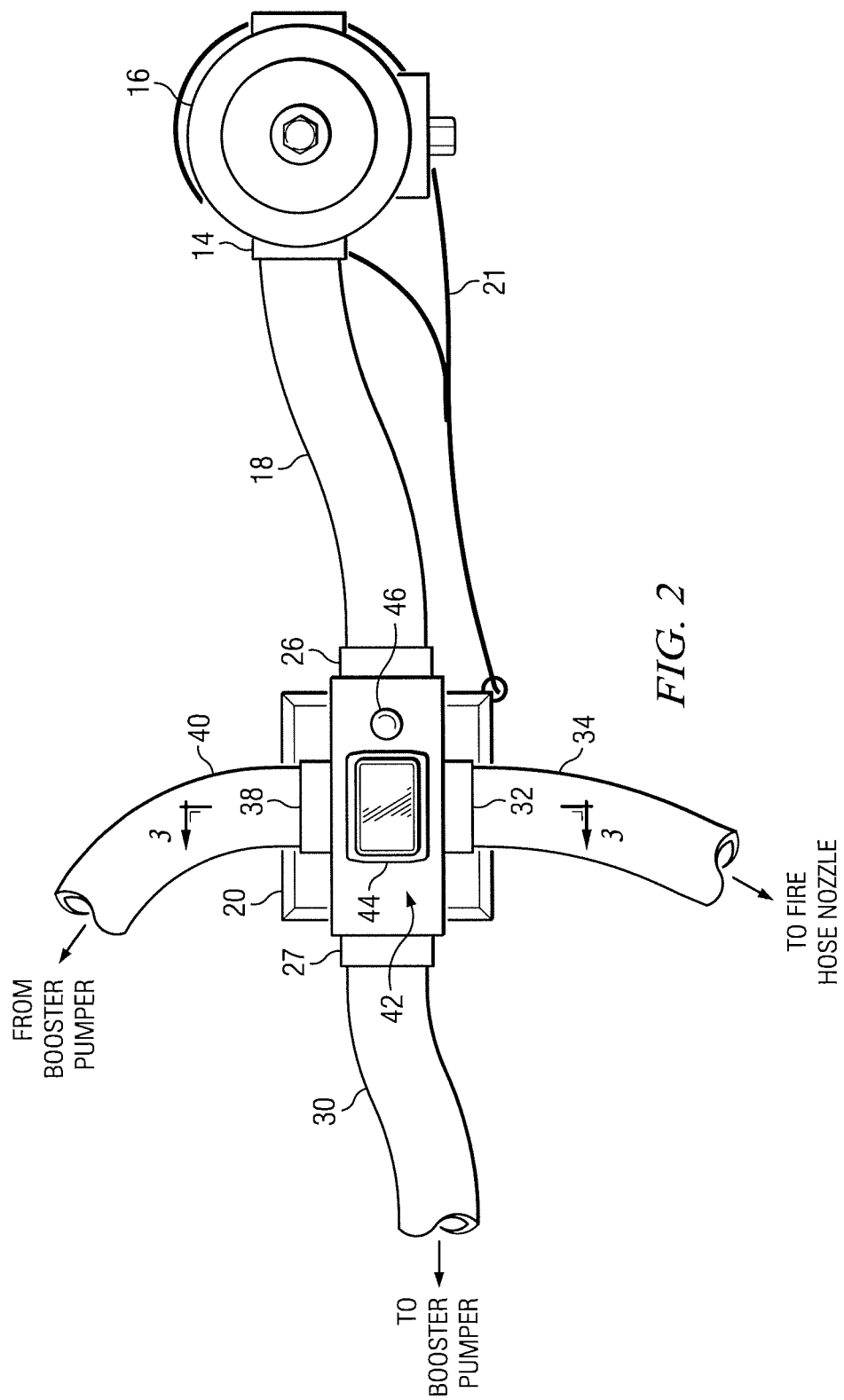
FIG. 2 is a top plan view of an exemplary embodiment of a water supply control system for firefighting applications.

As shown in FIGS. 1 and 2, water supply control system 10 includes two fluid valve chambers 22 and 23. Valve chamber 22 includes an inlet port 26 intended to be coupled to fire hydrant 16 and an outlet port 27 intended to be a flush discharge outlet port or coupled to a booster pumper 28 via another segment of a fire hose 30. Valve chamber 23 is disposed below passageway 22 and oriented at a predetermined angle therefrom, for example, oriented at about 90 degrees with respect to valve chamber 22. Valve chamber 23 includes an outlet port 30 intended to be coupled to a fire hose 34 and nozzle 36 operable to conduct and apply the water to extinguish the flames. Valve chamber 23 of valve assembly 12 further includes an inlet port 38 intended to be coupled to a fire hose segment 40 conducting water from booster pumper 28. Valve assembly 12 includes the proper threading for secure coupling to fire hose segments 18, 30, 34, and 40.

As best seen in FIG. 1, a status indicator 42 and a scene lighting assembly 44 are situated atop valve assembly 12. Status indicator 42 includes the proper circuitry and sensor to provide a visual indication of the open or closed status of one or more valves in valve assembly 12, discussed in more detail below. Scene lighting assembly 44 is operable to provide high-intensity light to illuminate the general surrounding areas or to selectively illuminate a specific area. Scene lighting assembly 44 may employ LED technology or another lighting technology later to be developed. Scene lighting assembly 44 may incorporate an appropriate lens to reflect, direct, and intensify the light emitted by the LEDs. Status indicator 42 and scene lighting assembly 44 may be powered by battery or by a power source onboard a fire truck, for example.

Figure 3:
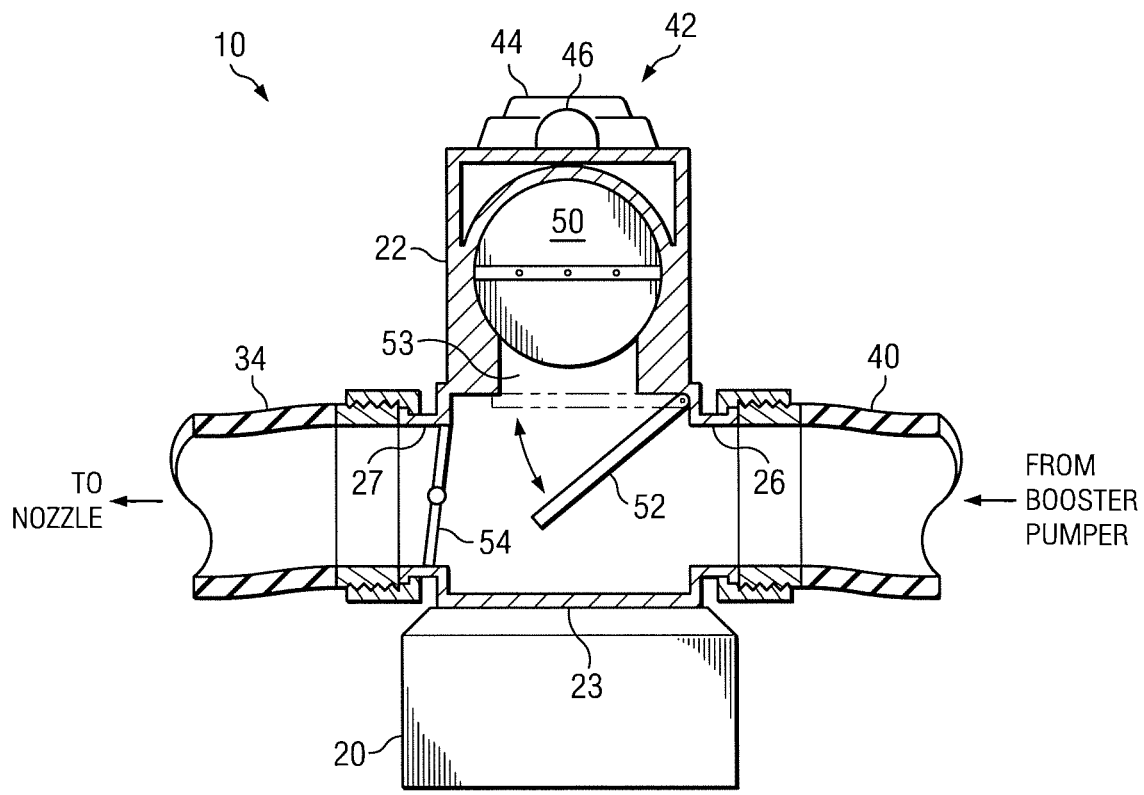
FIG. 3 is a cross-sectional view of an exemplary embodiment of a water supply control system for firefighting applications along line 3-3 shown in FIG. 2.

FIG. 3 is a cross-sectional view of an exemplary embodiment of a water supply control system 10 for firefighting applications along line 3-3 shown in FIG. 2. A first valve 50 is disposed near outlet port 27 of valve assembly 12. First valve 50 may be of any appropriate type, such as check valve, butterfly valve, gate valve, ball valve, etc. First valve 50 may be operated manually or via wired or radio-frequency control. An appropriate lever, handle, wheel, or control interface now known or later developed is provided to manipulate first valve 50 but not explicitly shown herein.

Valve assembly 12 further includes two valves 52 and 54 on either ends of passageway 23. Second valve 52 is disposed near inlet port 26 of valve assembly 12, as well as a passageway 53 connecting first and second valve chambers 23 and 22. Second valve 52 may be a clapper-type valve having two alternate positions: a first position operable to shut and seal-off inlet port 26, and a second position operable to shut and seal-off valve chamber 23 from valve chamber 22. A third valve 54 is disposed near outlet port 27 of valve assembly 12. Second and third valves 52 and 54 may each be of any appropriate type, such as check valve, butterfly valve, gate valve, ball valve, or another appropriate type of valve, and may each be operated manually or via wired or radio-frequency control. Appropriate levers, handles, wheels, or control interface now known or later developed are provided to manipulate valves 52 and 54 but not explicitly shown herein.

In operation, one or two firefighters unload water supply control system 10 from the fire truck and place it on the ground near water hydrant 10 from which they desire to use as the water supply. A firefighter fastens the free end of flexible tether strap 21 to fire hydrant 16, which is already secured at the other end to water supply control system 10. Tether strap 21 thus limits movement of water supply control system 10 away from the hydrant, and ensures that it does not pull on the fire hose connected between the hydrant and the system 10.

The firefighters may then couple a hose segment 18 connected to inlet port 26 of water supply control system 10 to an outlet nozzle of fire hydrant 16. All valves 50-54 of water supply control system 10 should be in the off position initially. After hose segment 18 is securely coupled to one of the hydrant's outlet nozzle, the hydrant valve may be opened to allow water to enter valve chamber 22 of valve assembly 12. A firefighter may flush the hydrant by opening valve 50 to allow water and debris from fire hydrant 16 to exit outlet port 27. In this mode of operation, valve 54 leading to outlet port 27 is closed. Further, due to the water pressure from water entering into valve chambers 22 and 23, clapper valve 52 is also forced to close over inlet port 26. Valve 50 is turned off when flushing is completed.

To conduct hydrant water to the site of the fire, a second hose 34 is coupled to outlet port 32 of water supply control system 10. Valve 54 is used to open or shut off outlet port 32 and may be operated manually or via radio control. Opening valve 54 allows water to fill fire hose 34 and to reach the firefighting site. Status indicator 46 is operable to provide a visual cue of whether valve 54 is open or closed. For example, if valve 54 is open, status indicator 46 may produce and emit a green light, and if valve 54 is closed, status indicator 46 may produce and emit a red light. In this way, a pumper operator may easily determine whether valve 54 is open or closed. In addition, status indicator 46 may provide other status information as desired.

Additionally for night operations, scene lighting 44 provides high intensity illumination of the general surroundings and to enable the firefighters to more easily install the water supply control system to the fire hydrant, coupling the booster pumper, and any other task.

It may be desirable to increase the water pressure and flow of the water delivered to the fire hose nozzle 36 by using a booster pumper or booster pump 28. The intake of booster pumper 28 may be coupled to flush outlet port 27 of the valve assembly via a hose 30, and the discharge outlet of booster pumper 28 may be coupled to inlet port 38 of the valve assembly via a hose 40. In this operating mode, valve 50 is opened to permit the water from the hydrant to be directed to the booster pumper via hose 30, which sends higher pressure water to valve assembly 12 via hose 40 and inlet port 26. The water entering valve chamber 23 from the booster pumper causes clapper valve 52 to close off passageway 53 disposed between valve chambers 22 and 23, and the water exits valve assembly 12 to the firefighting hose via discharge port 27.

Figure 4:
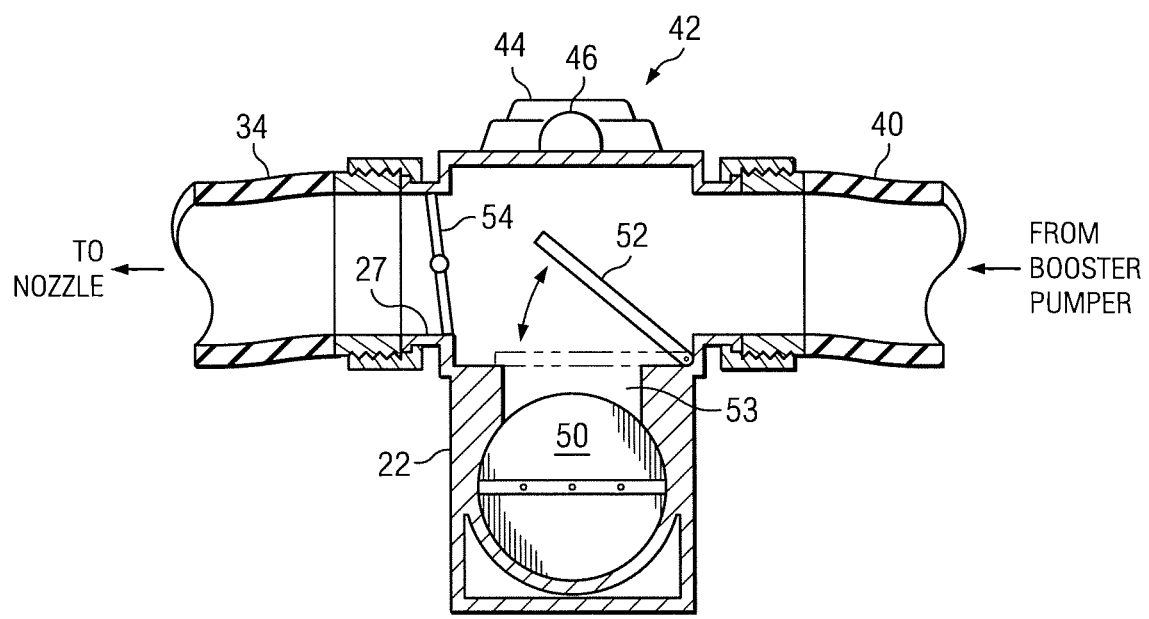
FIG. 4 is a cross-sectional view of another exemplary embodiment of a water supply control system for firefighting applications.

It should be noted that four-way valve assembly 12 may have a different configuration and still achieve the same function. For example as shown in an alternate embodiment in FIG. 4, valve chamber 22 oriented between inlet port 26 coupled to the fire hydrant and flush outlet port 27 may be disposed on a plane below valve chamber 23.

Although valve assembly 12 may be somewhat bulky and heavy, because it sits on the ground while being connected to the fire hydrant via the flexible fire hose without having to support its weight, the deployment process is easier and less risky to the firefighters compared to conventional valve systems. Its installation is similar to connecting fire hose to the hydrant once the valve assembly is unloaded from the fire truck and positioned near the fire hydrant. The use of flexible strap 21 restrains movement of water supply control system 10 away from the fire hydrant, to limit stress on the fire hose and the hydrant connection. Further, the provision of scene lighting 44 enables the firefighting personnel to see and operate more safely in a dark environment.

The features of the present invention which are believed to be novel are set forth below with particularity in the appended claims. However, modifications, variations, and changes to the exemplary embodiments described above will be apparent to those skilled in the art, and the water supply control system described herein thus encompasses such modifications, variations, and changes and are not limited to the specific embodiments described herein.

What is claimed is:

1. A water supply control system for use with a fire hydrant, comprising:
   a four-way valve assembly having a first inlet port for coupling to a nozzle of the fire hydrant via a segment of a fire hose, and a first outlet port for alternately flushing debris and water from the fire hydrant and coupling to an intake line of a booster pump, and a second inlet port for coupling to a discharge line of the booster pump, and a second outlet port for coupling to a fire hose conducting water from the fire hydrant to the site of fire, the four-way valve assembly operable to selectively open and close the inlet and outlet ports according to an operating mode of the four-way valve assembly;

a stable and sturdy platform substantially supporting the weight of the four-way valve assembly;

a flexible tether strap secured to the platform at a first end and having a fastener at a second end for releasably coupling to the fire hydrant;

a status indicator mounted on the four-way valve assembly operable to provide a visual indication of the operation mode of the four-way valve assembly; and a scene light mounted on the four-way assembly operable to provide high-intensity illumination.

2. The water supply control system of claim 1, wherein the four-way valve assembly comprises:

a first valve chamber disposed between the first inlet and outlet ports;

a second valve chamber disposed between the second inlet and outlet ports;

a passageway connecting the first and second valve chambers; and a first valve operable to alternately close off the passageway in a first operating position or close off the second inlet port in a second operating position.

3. The water supply control system of claim 2, wherein the four-way valve assembly further comprises a second valve operable to close off the second outlet port, and the status indicator is operable to indicate whether the second valve is open or closed.

4. The water supply control system of claim 3, wherein the four-way valve assembly further comprises a third valve operable to close off the first outlet port.

5. The water supply control system of claim 1, wherein the first, second, and third valves are manually-operated.

6. The water supply control system of claim 1, wherein at least one of the first, second, and third valves is radio frequency-controlled.

7. The water supply control system of claim 1, wherein the flexible tether strap includes a loop at the second end.

8. A water supply control system for use with a fire hydrant, comprising:

a four-way valve assembly having a first inlet port for coupling to a nozzle of the fire hydrant via a segment of a fire hose, and a first outlet port for alternately flushing debris and water from the fire hydrant and coupling to an intake line of a booster pump, and a second inlet port for coupling to a discharge line of the booster pump, and a second outlet port for coupling to a fire hose conducting water from the fire hydrant to the site of fire, the four-way valve assembly operable to selectively open and close the inlet and outlet ports according to an operating mode of the four-way valve assembly;

a first valve chamber disposed between the first inlet and outlet ports;

a second valve chamber disposed between the second inlet and outlet ports;

a passageway connecting the first and second valve chambers;

a first valve operable to alternately close off the passageway in a first operating position or close off the second inlet port in a second operating position;

a second valve operable to close off the second outlet port;

a third valve operable to close off the first outlet port;

a status indicator mounted on the four-way valve assembly operable to provide a visual indication of whether the second valve is open or closed;

a stable and sturdy platform substantially supporting the weight of the four-way valve assembly; and a chain secured to the platform at a first end and having a fastener at a second end for releasably coupling to the fire hydrant.

9. The water supply control system of claim 8, further comprising a scene light mounted on the four-way assembly operable to provide high-intensity illumination.

10. The water supply control system of claim 8, wherein at least one of the first, second, and third valves is manually-operated.

11. The water supply control system of claim 8, wherein at least one of the first, second, and third valves is radio frequency-controlled.

12. The water supply control system of claim 8, wherein the flexible tether strap includes a loop at the second end.

13. A method to control water supplied by a fire hydrant, comprising:

coupling a four-way valve assembly to a nozzle of the fire hydrant using a first fire hose, the weight of the four-way valve assembly being substantially supported by a platform secured thereto, the four-way valve assembly including a first inlet port for coupling to the fire hydrant nozzle, and a first outlet port for alternately flushing debris and water from the fire hydrant and coupling to an intake line of a booster pump, and a second inlet port for coupling to a discharge line of the booster pump, and a second outlet port for coupling to a second fire hose conducting water from the fire hydrant to the site of fire, the four-way valve assembly operable to selectively open and close the inlet and outlet ports according to an operating mode of the four-way valve assembly, the four-way valve assembly further includes a first valve chamber disposed between the first inlet and outlet ports, a second valve chamber disposed between the second inlet and outlet ports, a passageway connecting the first and second valve chambers, a first valve operable to alternately close off the passageway in a first operating position or close off the second inlet port in a second operating position, a second valve operable to close off the second outlet port, and a third valve operable to close off the first outlet port;

securely tethering the four-way valve assembly to the fire hydrant using a chain;

flushing debris and water from the hydrant via the first outlet port by opening the third valve;

delivering water from the hydrant via the second outlet port by opening the second valve and receiving visual indication confirming the proper operation of the second valve; and boosting water pressure by attaching an intake line of a booster pump to the first outlet port, and a discharge line of the booster pump to the first inlet port, and allowing the first valve to be in the first operating position to close off the passageway connected between the first and second valve chambers.

\* \* \* \* \*